(12) United States Patent
Eade

(10) Patent No.: US 8,964,812 B2
(45) Date of Patent: Feb. 24, 2015

(54) METHOD IN A CDMA RECEIVER USING HARDWARE AND SOFTWARE IN ACQUISITION, TRACKING AND HOSTING

(75) Inventor: Philip Geoffrey Eade, Guildford (GB)

(73) Assignee: Nokia Corporation, Espoo (FI)

( * ) Notice: Subject to any disclaimer, the term of this patent is extended or adjusted under 35 U.S.C. 154(b) by 986 days.

(21) Appl. No.: 12/301,402

(22) PCT Filed: May 24, 2006

(86) PCT No.: PCT/IB2006/001366
§ 371 (c)(1),
(2), (4) Date: May 7, 2009

(87) PCT Pub. No.: WO2007/135472
PCT Pub. Date: Nov. 29, 2007

(65) Prior Publication Data
US 2009/0304050 A1    Dec. 10, 2009

(51) Int. Cl.
| | | |
|---|---|---|
| H04B 1/00 | (2006.01) | |
| H04B 1/707 | (2011.01) | |
| G01S 19/24 | (2010.01) | |
| G01S 19/37 | (2010.01) | |
| G01S 19/29 | (2010.01) | |
| G01S 19/30 | (2010.01) | |

(52) U.S. Cl.
CPC ............ *H04B 1/707* (2013.01); *G01S 19/24* (2013.01); *G01S 19/37* (2013.01); *G01S 19/29* (2013.01); *G01S 19/30* (2013.01); *H04B 2201/70707* (2013.01); *H04B 2201/70711* (2013.01); *H04B 2201/70715* (2013.01)
USPC ........... 375/147; 375/148; 375/150; 375/227; 375/346

(58) Field of Classification Search
CPC ......... G01S 19/37; G01S 19/33; G01S 19/24; G01S 19/49; G01S 19/30
USPC ................ 375/354, 316, 344, 343, 147, 130; 342/357.22, 386; 455/130
See application file for complete search history.

(56) References Cited

U.S. PATENT DOCUMENTS

| | | | |
|---|---|---|---|
| 6,278,403 B1 | 8/2001 | Peng et al. | |
| 7,010,060 B2 * | 3/2006 | Ledvina et al. | ................ 375/316 |
| 7,161,977 B1 * | 1/2007 | Jung | ............................ 375/150 |

(Continued)

FOREIGN PATENT DOCUMENTS

| | | |
|---|---|---|
| JP | 7-202757 A | 8/1995 |
| JP | 2002-542470 A | 12/2002 |

(Continued)

OTHER PUBLICATIONS

International Search Report dated Aug. 11, 2010 for Application No. 06755907.0-1246/2022177 PCT/IB2006001366.

(Continued)

*Primary Examiner* — Shuwang Liu
*Assistant Examiner* — Ross Varndell
(74) *Attorney, Agent, or Firm* — Banner & Witcoff, Ltd.

(57) ABSTRACT

A method including: using both dedicated circuitry and a programmable processor system for acquisition of a communication channel; and using the dedicated circuitry for tracking the acquired communication channel while using the programmable processor system for hosting an application that uses information dependent upon data dependent on the acquired communication channel.

26 Claims, 2 Drawing Sheets

(56) References Cited

U.S. PATENT DOCUMENTS

| | | |
|---|---|---|
| 2004/0213334 A1 | 10/2004 | Ledvina et al. |
| 2005/0110677 A1 | 5/2005 | Schipper et al. |
| 2005/0162313 A1 | 7/2005 | Ito et al. |
| 2005/0212699 A1 | 9/2005 | Horslund |
| 2006/0013287 A1* | 1/2006 | Normark et al. ............ 375/142 |

FOREIGN PATENT DOCUMENTS

| | | |
|---|---|---|
| JP | 2003-199169 A | 11/2003 |
| JP | 2005-515403 A | 5/2005 |
| JP | 2005-207991 A | 8/2005 |
| JP | 2006-058297 A | 3/2006 |
| WO | 0063646 A1 | 10/2000 |
| WO | 01-79877 A2 | 10/2001 |
| WO | 03-008993 A2 | 1/2003 |
| WO | 03/008993 A2 | 1/2003 |
| WO | 03067780 A1 | 8/2003 |
| WO | 2005-022187 A2 | 3/2005 |

OTHER PUBLICATIONS

Daffara, F. et al., "Improved search algorithm for fast acquisition in a DSP-based GPS receiver", Signals, Systems, and Electronics, 1998, pp. 310-314, Issue 98.

International Search Report, Mar. 2007.

Notification of Grounds of Rejection for Japanese Patent Application No. 2009-511588 dated Sep. 5, 2011.

Takashi Asai et al., "Software Solution for GPS Baseband Processing using a 32-bit Embedded Microprocessor," The Journal of the Institute of Image and Television Engineers, 53 (5), 1999, pp. 738-745.

Notification of Grounds of Rejection for Japanese Patent Application No. 2009-511588 dated Jan. 31, 2012.

Notification of Grounds of Rejection dated Jun. 4, 2012 in Japanese Application No. 2009-511588 and English translation thereof.

Asai et al., "Software Solution for GPS Basehand Processing using a 32-bit Embedded Microprocessor," The Journal of the Institute of Image and Television Engineers, 53 (5), 1999, pp. 738-745.

* cited by examiner

METHOD IN A CDMA RECEIVER USING HARDWARE AND SOFTWARE IN ACQUISITION, TRACKING AND HOSTING

This application claims the benefit of International Patent Application No. PCT/IB2006/001366, filed on May 24, 2006, the specification for which is hereby incorporated by reference.

FIELD OF THE INVENTION

Embodiments of the present invention relate to the effective use of resources. They relate to the improved use of dedicated circuitry (hardware) and a programmable processor system (software) and, in particular, their selective use in a radio receiver.

BACKGROUND TO THE INVENTION

There is always a desire to be able to implement a system as cheaply as possible and to be able to use resources as effectively as possible.

In a radio receiver implementation there are certain functions that are carried out in dedicated circuitry and other functions that may be carried out in dedicated circuitry or using a programmable processor. If the radio receiver is part of a host it is not evident what receiver functions should be performed using the processing resources of the host itself and what functions should be performed using dedicated receiver circuitry.

Multiple Access (MA) refers to protocols that enable multiple communication channels to use a frequency band.

Code Division Multiple Access (CDMA) is a protocol that enables multiple communication channels to share a single frequency band by using orthogonal chipping codes to spread the data across the full frequency band. The chipping codes are also called pseudo random noise codes. CDMA is used in some mobile cellular telephone systems such as IS-95, cdma-2000, UMTS etc and is also used in other communication systems. For example, some Global Navigation Satellite (GNSS) Systems such as Global Positioning Systems (GPS) and the proposed European system Galileo use CDMA. A different chipping code is assigned to each satellite communication channel but all the satellite communication channels share the same frequency band.

Another Global Navigation Satellite System, GLONASS, uses frequency division multiple access. A different frequency band is assigned to each satellite communication channel but all the satellite communication channels share the same chipping code.

For the sake of simplicity, reference will now be made to a GNSS receiver, however, it should be appreciated that embodiments of the invention find application in other types of radio receivers.

A GNSS receiver is a complex system. It typically comprises an RF engine for demodulating RF signals, a measurement engine for acquiring the satellite communication channels, for tracking the satellite communication channels and for recovering transmitted data from each of the satellite communication channels and a position engine for solving time and geometric unknowns using the recovered data.

Acquisition is a complex process. The communication channel parameters are unknown and therefore "processing" is required to find those parameters. For a GPS system, which uses CDMA, the unknown parameters of the communication channel are the chipping code, the phase of the chipping code and the exact carrier frequency as modified by, for example, Doppler shifting.

Tracking is a less complex process. The communication parameters are known but need to be maintained. Much less "processing" is required compared to acquisition.

Traditionally the engines have been implemented in dedicated receiver circuitry that demodulates the RF signals, acquires and tracks the communication channels, recovers transmitted data from each of the communication channels and solves the time and geometric unknowns using the recovered data to position the receiver.

Recently 'software' receivers have been designed. Dedicated RF circuitry is used as an RF engine to demodulate the RF signals which are stored in memory. A programmed processor is used as the measurement engine and the position engine. It reads the memory, acquires and tracks the communication channels, recovers transmitted data from each of the communication channels and solves the time and geometric unknowns using the recovered data to position the receiver.

Software receivers provide significant flexibility because the measurement and positioning algorithms are implemented using software in a programmable processor. The acquisition, tracking, data recovery and positioning algorithms can be changed according to the navigation system that is being used. Given the development of future GNSS systems such as Galileo, GLONASS and modernization programs of the existing GPS system, this becomes a more attractive solution than one that is fixed in dedicated circuitry.

However, software receivers are computationally intensive and require significant RAM for acquisition and tracking.

This may make the software receiver expensive. It also makes it unsuitable for integration with a host where the software receiver shares host resources with an application because either the resources demanded by the software receiver will interfere with the proper operation of the application or a higher specified and more expensive host will be required.

DEFINITIONS

"Dedicated" is used as an adjective for a noun to describe that the noun is configured, adapted or optimized for the performance of a specific function or functions. "Dedicated" encompasses both "permanently dedicated" and "temporarily dedicated". "Permanently dedicated" is used as an adjective for a noun to describe that the noun is permanently configured, adapted or optimized for the performance of only a specific function or functions. "Temporarily dedicated" is used as an adjective for a noun to describe that the noun is configured, adapted or optimized for the performance of a specific function for a period of time but not otherwise. "Temporarily dedicated" encompasses "variably dedicated", which is used as an adjective for a noun to describe that the noun is configured, adapted or optimized for the performance of different specific functions at different times.

BRIEF DESCRIPTION OF THE INVENTION

According to one embodiment of the invention there is provided a method comprising: using both dedicated circuitry and a programmable processor system for acquisition of a communication channel; and using the dedicated circuitry for tracking the acquired communication channel while using the programmable processor system for hosting an application that uses information dependent upon data dependent on the acquired communication channel.

The method may further comprise transferring partially decoded data from the dedicated circuitry to the processor system when acquiring the communications channel and transferring information dependent on fully decoded data from the dedicated circuitry to the processor system when tracking the communications channel.

According to another embodiment of the invention there is provided a system comprising: dedicated circuitry and a programmable processor system that operate together to acquire a communication channel and operate separately to respectively track an acquired communication channel and host an application that uses information from the acquired communication channel.

According to another embodiment of the invention there is provided circuitry for enabling the decoding of encoded data, comprising an interface, which, in a first channel acquisition mode, outputs partially decoded data and, in a second channel maintenance mode following the first channel acquisition mode, outputs information dependent on the decoded data.

According to another embodiment of the invention there is provided a method comprising: using dedicated circuitry and resources of a processor system for communication channel acquisition; and after acquisition, releasing the resources of the processor system for use by an application and using the dedicated circuitry and not the processor system for communication channel tracking.

According to another embodiment of the invention there is provided a method comprising: using dedicated circuitry and resources of a processor system for signal processing during a first signal processing phase; and after the first signal processing phase, releasing the resources of the processor system for use by an application and simultaneously using the dedicated circuitry and not the processor system for signal processing during a second signal processing phase, wherein the first phase is computationally more intensive than the second phase.

The "dedicated" circuitry is, in one example, specific for the GNSS functions during the GNSS operations. If GNSS operation is not being performed then it's possible that this "dedicated" circuitry could be re-used for alternative functions.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 2A:
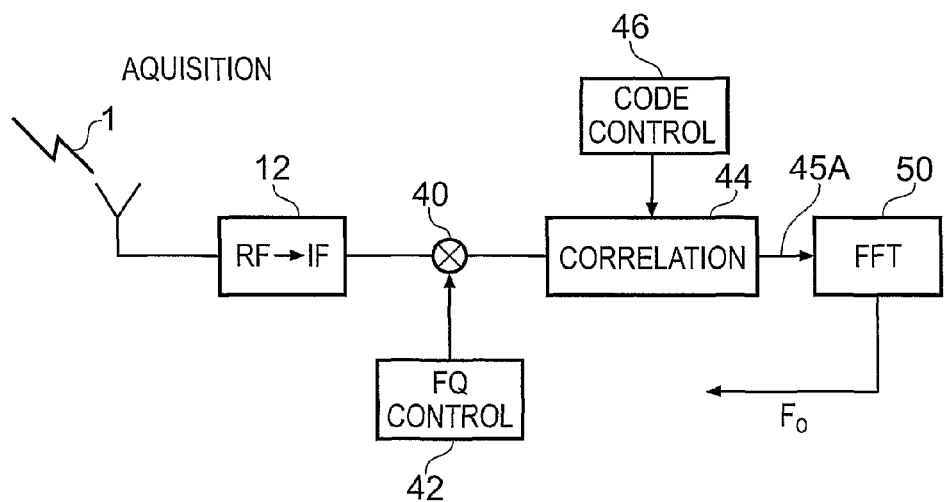
FIG. 2A schematically illustrates a GNSS receiver system during channel acquisition.

Embodiments of the invention may use dedicated circuitry 2 and resources of a processor system 4 for signal processing during a first signal processing phase (FIG. 2A). After the first phase, the resources of the processor system 4 are released for use by an application 22. Simultaneously the dedicated circuitry 2, but not the processor system 4, is used for signal processing during a second signal processing phase (FIG. 2B) that is computationally less intensive than the first phase. The application may use data determined during the second signal processing phase.

The signal processing required in the first signal processing phase may be necessary for acquisition of a communications channel and the signal processing required in the second signal processing phase may be necessary for tracking an acquired communications channel.

Figure 2B:
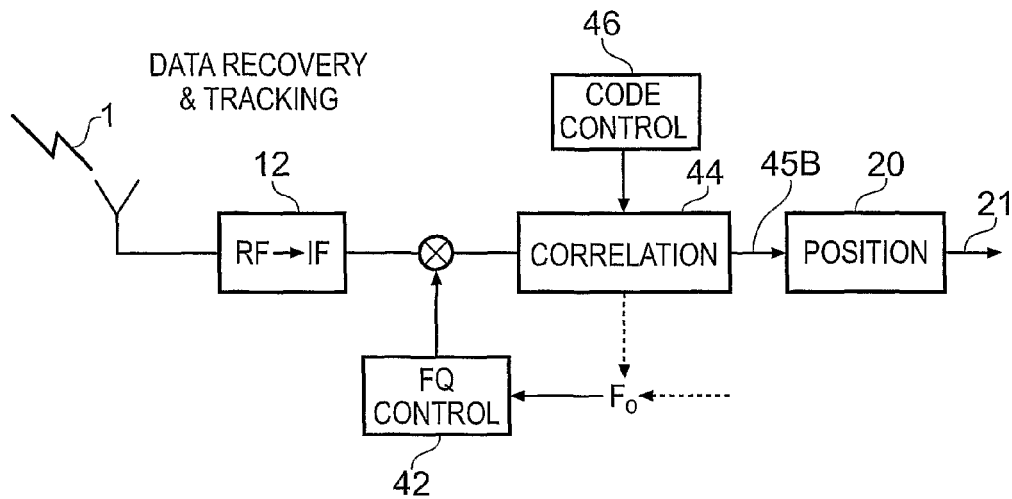
FIG. 2B schematically illustrates a GNSS receiver system during data recovery and tracking.

Partially processed data 45A may be transferred from the dedicated circuitry 2 to the processor system during the first phase (FIG. 2A), whereas fully processed data 45B, 21 may be transferred from the dedicated circuitry 2 to the processor system 4 during the second phase (FIG. 2B).

At least some of the baseband functions e.g. correlation 44 performed by the dedicated circuitry 2 are common between the first and second phases.

Although the following description makes particular reference to a GNSS receiver system 10, it should be realized that the invention has broader application and may be used in any suitable radio receiver system and, in particular, those radio receiver systems that correlate for a spreading code or codes.

Figure 1:
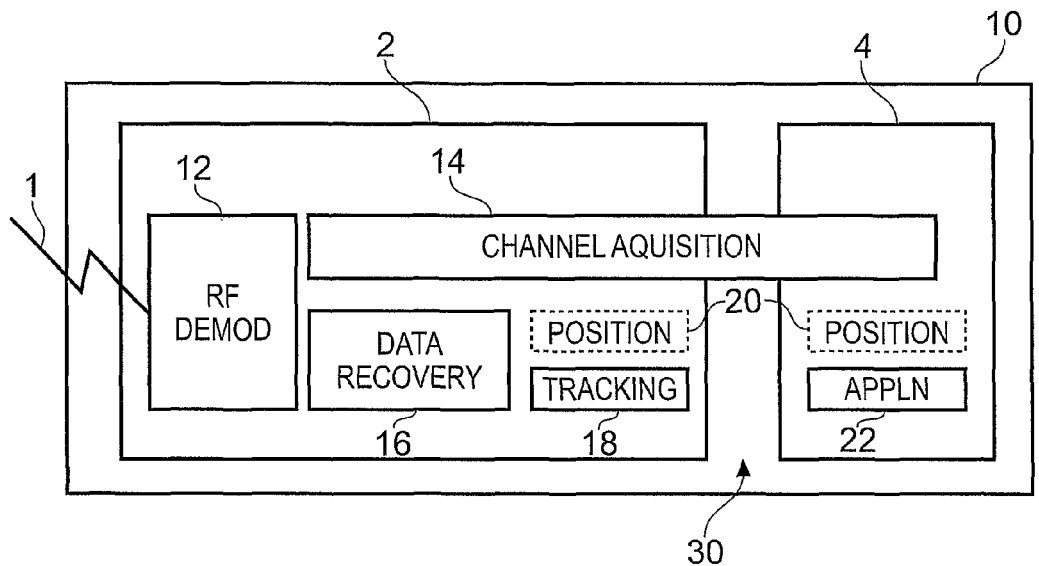
FIG. 1 schematically illustrates a GNSS receiver system for obtaining a position from GNSS satellites.

FIG. 1 schematically illustrates a GNSS receiver system 10 for obtaining a position from GNSS satellites.

A GNSS satellite communications channel is separated from the other satellite communication channels of the same GNSS by a unique combination of chipping code and frequency. In GPS, each satellite shares the same frequency band but has a different chipping code, whereas in GLONASS each satellite uses the same chipping code but has a different frequency band. As each channel is associated with a different satellite that has a different velocity relative to a receiver, each communications channel has, because of the Doppler effect, its own unknown frequency within a nominal carrier frequency band. A communication channel can therefore be defined by the parameters: chipping code, chipping code phase, and frequency as affected by Doppler shift.

The chipping code phase gives an initial indication of the time of flight to the satellite from the receiver system 10 and is referred to as a pseudo-range. It must be corrected for at least receiver clock error compared to the satellite clock before it represents a true range. It may also be corrected for satellite clock and orbit errors and RF signal transmission errors.

A position engine solves at least four equations with four unknowns to make a three dimensional position fix. The four unknowns are the three degrees of freedom in the receiver position (x, y, z) and the receiver time according to the 'true' satellite time reference. The GNSS receiver system 10 must therefore acquire four separate communication channels.

Acquisition is the process that a GNSS receiver system 10 uses to find satellite communication channels given a set of starting conditions (or uncertainties). This involves achieving frequency lock and code phase alignment and normally decoding data sufficiently to enable determination of each pseudorange. It may not be necessary to decode the communication channel data to determine the pseudorange, if standard forms of Assisted GPS operation are being used.

Over time, the relative velocities of the receiver to each satellite may change and the error in the receiver clock may vary. For these reasons, it is important that the receiver is able to track each acquired communication channel independently so that once acquired it is not subsequently lost.

The receiver system 10 comprises dedicated circuitry (hardware) 2 and a processor system (software platform) 4. The "dedicated" circuitry is, in one example, specific for the GNSS functions during the GNSS operations, If GNSS operation is not being performed then it's possible that this "dedicated" circuitry could be re-used for alternative functions. The processor system comprises at least a processor and a memory. An interface 30 interconnects the dedicated circuitry 2 and the processor system 4. This interface may be the physical connections between two separate devices or it may be internal within a System on Chip (SoC) design.

The receiver system comprises an RF engine 12 for demodulating RF signals, a measurement engine 14, 16, 18 for acquiring the satellite communication channels, for tracking the satellite communication channels and for recovering transmitted data from each of the satellite communication channels and possibly a position engine 20 for solving time and geometric unknowns using the recovered data to determine the receiver system's position. The system also comprises an application 22 that uses the receiver system's position such as a mapping or guidance application. The measurement engine uses both the dedicated circuitry 2 and the processor system 4.

The position engine 20 is typically within either the dedicated circuitry 2 or the processor system 4.

The measurement engine comprises a channel acquisition block 14 for acquiring the satellite communication channels, a tracking block 18 for tracking the satellite communication channels and a data recovery block 16 for recovering transmitted data from each of the satellite communication channels.

The channel acquisition block 14 is provided using both the dedicated circuitry 2 and also the processor system 4. The tracking block 18 and the data recovery block 16 are provided by the dedicated circuitry 2 only.

Encoded data 1 is received via a communications channel that has been encoded using at least two parameters, typically frequency and a chipping code.

Acquisition of a communications channel involves the determination of the at least two parameters that define the channel. This may involve decoding GNSS data streams sufficiently to enable not only the CDMA code correlation (giving nanosecond time) but also the correct GNSS data bit alignment (that resolves the GNSS millisecond time) and the GNSS data frames (giving GNSS second time) and hence complete determination of each pseudorange. However it may not be necessary to decode the communication channel (GNSS) data to determine the pseudorange, if standard forms of Assisted GPS operation are being used. If accurate GNSS time (for GPS this is <+/−0.5 msec) is provided to the GPS Receiver, then it only needs to determine the CDMA code correlation time to completely determine each pseudorange.

Tracking of a communications channel involves the maintenance of the at least two parameters that define the channel and occasionally updating Satellite Data information as this changes from time to time (every 2 hours for GPS).

The dedicated circuitry 2 determines at least one of the parameters and decodes the encoded data with respect to that parameter or parameters to create the partially encoded data 45A. In the example given below, the dedicated circuitry 2 determines the chipping code for the communications channel but not the frequency. However, in other implementations the circuitry 2 may determine the frequency but not the chipping code.

The interface 30, in a channel acquisition mode (FIG. 2A), outputs partially encoded data 45A to the processor system 4. Partially encoded data is the data encoded by at least one parameter. In the example given below, the parameter that encodes the partially encoded data is an unknown frequency, the chipping code having been determined in the dedicated circuitry 2.

The processor system 4, in a channel acquisition mode (FIG. 2A), receives partially encoded data 45A and fully decodes the data. In the example given below, the processor system 4 determines the unknown frequency $F_o$ that encodes the partially encoded data 45A and returns it, via interface 30, to the dedicated circuitry 2.

The interface 30, in a second channel maintenance mode (FIG. 2B) following the first channel acquisition mode, outputs information dependent on the decoded data to the processor system 4. This information may be pseudo-ranges 45B or position information 21. The dedicated circuitry 2 also maintains the at least two parameters and decodes the encoded data with respect to the maintained parameters. In the example given below, the tracking block 18 maintains the frequency and/or code phase offset and the data recovery block 16 produces the pseudo-ranges 45A.

FIG. 2A schematically illustrates a GNSS receiver system 10 during channel acquisition.

Encoded data 1 is received via an antenna and converted by the RF engine 12, it is then frequency shifted from an intermediate frequency IF to a baseband frequency by mixer 40 under the control of frequency controller 42. The baseband signal is correlated by correlator block 44 to produce a partially encoded signal 45A.

In this example, the GNSS receiver system 10 is a GPS receiver and the encoded data is encoded using a satellite specific chipping code but a common frequency band offset by a satellite specific Doppler shift.

Figure 3:
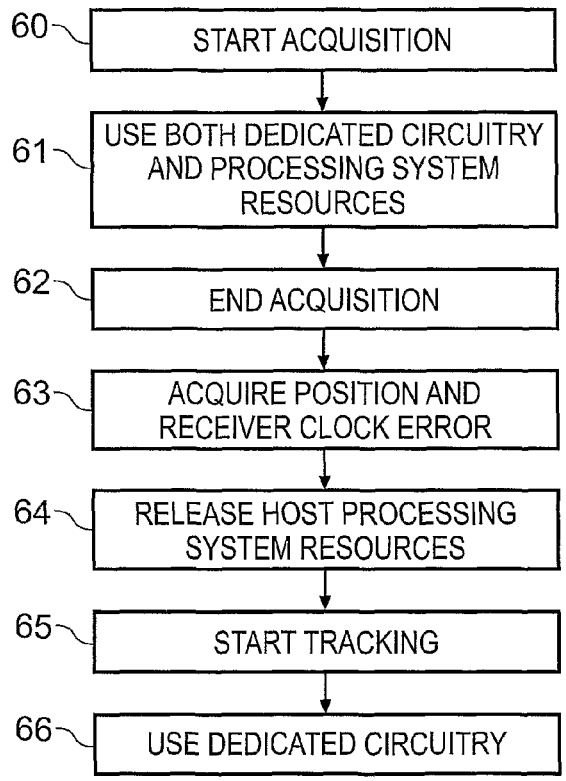
FIG. 3 illustrates a method of channel acquisition and tracking.

The correlator block 44 may be implemented as described in relation to FIG. 3 or 6 of WO 2005/104392 A1 as a group correlator.

In a group correlator, a chipping code is shifted into a code shift register of size N at a rate of one bit per chip. Simultaneously, the baseband signal is shifted into a sample shift register of size N at a rate of one bit per chip. Every N chips the content of the code shift register is transferred to a code register. Every chip the N bits of the code register are cross correlated with the respective N bits of the sample shift register. The code registers may be cascaded in series so that at any one time each holds a different sequential N bit portion of the same chipping code. In this case, each of the cascaded code registers is cross-correlated with the sample shift register in each chip period.

The same process may occur for different chipping codes in parallel group correlators.

The code controller 46 controls the codes and code parts provided to the respective code shift registers. The code controller may be programmable so that different code formats may be used.

The receiver clock accuracy introduces an error of several kHz as does Doppler shift. If one samples over one entire CDMA code period (for GPS this is 1023 chips in 1 millisecond, the code epoch) then the usable bandwidth will be less than 500 Hz and it will take many correlations to search the multiple kHz space in slices of frequency bins of less than 0.5 kHz.

The correlator block 44 because it correlates a part of the chipping code of size N, against N sequential samples, has an effective sampling rate of N times the chipping rate and is therefore able to search an increased frequency bandwidth. In fact it is able to search the whole of the frequency bandwidth for each of the chipping codes in parallel. This enables the correlator block to identify for received encoded data the relevant chipping codes and estimates of their respective chipping code phases without having to first determine their respective frequencies.

The output from the correlator block 44, the partially encoded data 45A, is supplied to the processor system 4 across the interface 30. The processor system 4 decodes the partially encoded data using frequency analysis 50 such as Fast Fourier Transform to identify the frequencies $F_o$ of the communication channels which are returned to the dedicated circuitry 2 via the interface 30. The frequency uncertainty introduced by Doppler shift and receiver clock error is thus resolved.

The processing system 4 may provide the processor and/or the memory for FFT. If the processing system provides only the memory, the processing may occur at the dedicated circuitry 2.

The processing system 4 can provide whatever frequency analysis is required according to the GNSS System uncertainties. Hence it is scalable for either CDMA networks which have small uncertainties due to being synchronous to a GPS time base, or for WCDMA/GSM networks that have greater uncertainties due to their asynchronous nature to GNSS system. The processing system 4 is fully scalable and can provide more or less processing power for the acquisition as required.

FIG. 2B schematically illustrates a GNSS receiver system 10 during data recovery and tracking.

When the frequency $F_o$ is received at the dedicated circuitry 2, it is passed to the frequency controller 42, which tunes the frequency to the correct frequency bin for the communication channel. The code controller then supplies the whole of the chipping code for the communications channel to the correlator block which cross correlates the whole of the chipping code with the baseband signal at the correct frequency bin.

The correlator block 44 is therefore able to determine a chipping code offset between the baseband signal and the chipping code. This indicates the time difference between the receiver and the satellite associated with the communications channel from the receiver clock reference and not the GNSS reference. This time difference or pseudo-range 45B is provided to the position engine 20. The position engine 20 may be located within the dedicated circuitry 2 or be provided by software running on the processor system 4.

Thus either pseudo-ranges 45B or Position Reports 21 are passed via interface 30 to the processor system 4 during tracking. Pseudo-ranges 45B are passed if the Position Engine 30 is implemented by software in the processing system 4. Position Reports 21 are passed if the Position Engine 20 is implemented in the dedicated circuitry 2.

The dedicated circuitry is capable of tracking communication channels without additional resources from the processing system. Once the correct satellite frequency and chipping code phase is determined, the rates of change are predictable and within the normal abilities of a tracking control loop. The only uncertainty is due to receiver's clock stability and the user's movements (in particular, their acceleration). However this too can normally be maintained by the tracking control loop given a certain bandwidth. It only needs to search adjacent frequency bins in case the frequency has suddenly changed in an unexpected way. However there should not be any need to re-search the initial kHz of frequency uncertainty.

It should be appreciated that parts of the dedicated circuitry, such as correlator 44, may be re-used in the acquisition stage and the tracking stage.

The application 22 uses the position reports 21 during the tracking process to provide output to a user such as a mapping or navigation service. Thus the dedicated circuitry 2 is used for tracking the acquired communication channels while the programmable processor system is used for hosting an application that uses information dependent upon data received over the acquired channels i.e. the phase of the chipping codes in the communication channels.

The dedicated circuitry 2 is not over specified. There is significantly less circuitry that is used only in the resource intensive acquisition process but not otherwise. Part, but not all, of the burden of acquisition has been moved from the dedicated circuitry 2 to the processor system 4 while the burden of tracking is maintained in the dedicated circuitry 2. The burden of acquisition is shared by the dedicated circuitry 2 and the processor system 4. The burden of tracking is taken by the dedicated circuitry 2 and the burden on the processor system 4 during tracking is significantly less that that which is placed on it during acquisition. This allows the processor system 4 to be used to run a resource intensive application during tracking.

FIG. 3 illustrates a method in which channel acquisition is started at block 60. Then during acquisition at block 61 both the dedicated circuitry and the processing system 4 resources are used. Then the channel acquisition stage ends at block 62. Next at block 63, the receiver position is determined. Then at block 64, the processing system 4 resources are released for use by, for example, an application hosted by the processor system 4. Next at block 65, the tracking stage commences in which the dedicated circuitry is used at block 66.

The resources of processor system 4 are used for communication channel acquisition but after acquisition are released to a host application. The processor system resources are used in an efficient time-shared manner.

The dedicated circuitry 2 is used for communication channel acquisition, but after acquisition it is used for communication channel tracking. Common dedicated circuitry may be used for tracking and acquisition. The dedicated circuitry resources are also used in an efficient time-shared manner.

Referring back to FIG. 1, the dedicated circuitry 2 may be integrated with the processing system 4 as a system on chip (SoC) or module or chipset. The fast data transfer that will occur during the Acquisition Phase between the dedicated circuitry 2 and the processor system 4 can be accommodated, for example, using direct memory access (DMA).

The SoC may be part of a cellular phone, PDA, navigation system, on-board car computer etc where the processing system is used to provide an application.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
    sharing a processing workload for acquisition of a communication channel between dedicated circuitry and a separate programmable processor system, wherein the dedicated circuitry partially decodes data for the acquisition of the communication channel to produce partially decoded data, wherein the acquisition of the communication channel comprises determining at least two parameters that define the communication channel, wherein one of the at least two parameters is a spreading code phase, wherein one of the at least two parameters is a frequency, and wherein at least one parameter of the at least two parameters is determined in the dedicated circuitry and at least one parameter of the at least two parameters is determined in the separate programmable processor system;
performing a processing workload for tracking the communication channel using the dedicated circuitry and not the separate programmable processor system while using the separate programmable processor system for hosting an application that uses information dependent upon data dependent on the communication channel;
transferring the partially decoded data from the dedicated circuitry to the separate programmable processor system during the acquisition of the communication channel; and
transferring information dependent on fully decoded data from the dedicated circuitry to the separate programmable processor system when tracking the communication channel.

2. A method as claimed in claim 1, wherein one of the at least two parameters is a spreading code.

3. A method as claimed in claim 1, wherein the communication channel is defined by one of a plurality of spreading codes and the dedicated circuitry identifies the spreading code for the communication channel and determines the spreading code phase.

4. A method as claimed in claim 1, wherein the separate programmable processor system is used to determine the frequency.

5. A method as claimed in claim 4, wherein the separate programmable processor system is used to perform frequency analysis.

6. A method as claimed in claim 1, wherein performing the processing workload for tracking the communication channel comprises maintaining the at least two parameters.

7. A method as claimed in claim 1, wherein at least one of one or more correlators in the dedicated circuitry or one or more matched filters in the dedicated circuitry are shared for tracking and acquisition.

8. A method as claimed in claim 1, further comprising using the communication channel to determine a position.

9. A method as claimed in claim 8, wherein the communication channel is a global navigation satellite system (GNSS) channel.

10. A system comprising:
dedicated circuitry and a separate programmable processor system that are configured to operate together to share a processing workload for acquisition of a communication channel, wherein the acquisition of the communication channel comprises determining at least two parameters that define the communication channel, wherein one of the at least two parameters is a spreading code phase, wherein one of the at least two parameters is a frequency, wherein the dedicated circuitry is configured to determine at least one parameter of the at least two parameters, and wherein the separate programmable processor system is configured to determine at least one parameter of the at least two parameters; and
an interface configured to transfer, during the acquisition of the communication channel, partially decoded data from the dedicated circuitry to the separate programmable processor system, and to transfer, during tracking of an acquired communication channel, information dependent on fully decoded data from the dedicated circuitry to the separate programmable processor system for use by an application that uses information from the acquired communication channel,
wherein the dedicated circuitry is configured to partially decode data to produce the partially decoded data for the acquisition of the communication channel, and
wherein the dedicated circuitry, and not the separate programmable processor system, is configured to perform a workload for tracking the acquired communication channel and the separate programmable processor system is configured to host the application that uses information from the acquired communication channel.

11. A system as claimed in claim 10, configured to use the acquired communication channel to determine a position.

12. A system as claimed in claim 11, wherein the acquired communication channel is a global navigation satellite system (GNSS) channel.

13. A system as claimed in claim 10, wherein the dedicated circuitry comprises a correlator configured to partially decode data comprising a chipping code for the communication channel, and wherein the separate programmable processor system is configured to receive the data comprising the chipping code for the communication channel, and in response to receiving the data comprising the chipping code for the communication channel determine the frequency.

14. A system as claimed in claim 10, wherein the dedicated circuitry is configured to enable decoding of encoded data, and comprises an interface, which is configured, in a channel acquisition mode, to output partially decoded data and, in a channel maintenance mode following the channel acquisition mode, to output information dependent on the partially decoded data.

15. A system as claimed in claim 14, wherein the encoded data is data received via a communication channel encoded by the at least two parameters.

16. A system as claimed in claim 15, wherein the dedicated circuitry is configured to decode the encoded data with respect to at least one of the at least two parameters to create the partially decoded data.

17. A system as claimed in claim 15, wherein the partially decoded data is data encoded by at least one parameter of the at least two parameters.

18. A system as claimed in claim 15, wherein the dedicated circuitry is configured to maintain the at least two parameters and decode the encoded data with respect to the at least two parameters.

19. A system as claimed in claim 14, configured to use the acquired communication channel to determine a position.

20. A system as claimed in claim 19, wherein the acquired communication channel is a global navigation satellite system (GNSS) channel.

21. A method comprising:
sharing a processing workload for acquisition of a communication channel between dedicated circuitry and resources of a separate programmable processor system, wherein the dedicated circuitry partially decodes data for the acquisition of the communication channel to produce partially decoded data, wherein the acquisition of the communication channel comprises determining at least two parameters that define the communication channel, wherein one of the at least two parameters is a spreading code phase, wherein one of the at least two parameters is a frequency, and wherein at least one parameter of the at least two parameters is determined in the dedicated circuitry and at least one parameter of the at least two parameters is determined in the separate programmable processor system;
after acquisition, releasing the resources of the separate programmable processor system for use by an application and performing a processing workload for tracking the communication channel using the dedicated circuitry and not the separate programmable processor system;

transferring the partially decoded data from the dedicated circuitry to the separate programmable processor system during the acquisition of the communication channel; and transferring information dependent on fully decoded data from the dedicated circuitry to the separate programmable processor system for use by the application.

22. A method as claimed in claim 21, further comprising using the communication channel to determine a position.

23. A method as claimed in claim 22, wherein the communication channel is a global navigation satellite system (GNSS) channel.

24. A method comprising:

sharing a processing workload for acquisition of a communication channel between dedicated circuitry and resources of a separate programmable processor system during a first signal processing phase, wherein the dedicated circuitry is configured to partially decode data for the acquisition of the communication channel, wherein the acquisition of the communication channel comprises determining at least two parameters that define the communication channel, wherein one of the at least two parameters is a spreading code phase, wherein one of the at least two parameters is a frequency, and wherein at least one parameter of the at least two parameters is determined in the dedicated circuitry and at least one parameter of the at least two parameters is determined in the separate programmable processor system;

after the first signal processing phase, releasing the resources of the separate programmable processor system for use by an application and simultaneously using the dedicated circuitry and not the separate programmable processor system to perform a processing workload of communication channel tracking during a second signal processing phase, wherein the first signal processing phase is computationally more intensive than the second signal processing phase;

transferring partially processed data from the dedicated circuitry to the separate programmable processor system during the first signal processing phase; and transferring fully processed data from the dedicated circuitry to the separate programmable processor system during the second signal processing phase.

25. A method as claimed in claim 24, wherein the application uses output from the second signal processing phase.

26. A method as claimed in claim 24, wherein at least some of the functions performed by the dedicated circuitry are common between the first signaling processing phase and the second signal processing phase.

* * * * *